United States Patent [19]

Belshaw et al.

[11] 3,947,178

[45] Mar. 30, 1976

[54] APPARATUS FOR MAKING FILLED FOOD PRODUCTS

[75] Inventors: Thomas E. Belshaw; Fred G. Woodworth; Wilbur D. Wilke, all of Seattle, Wash.

[73] Assignee: Belshaw Bros., Inc., Seattle, Wash.

[22] Filed: Sept. 30, 1974

[21] Appl. No.: 510,561

Related U.S. Application Data

[63] Continuation-in-part of Ser. No. 463,155, April 22, 1974.

[52] U.S. Cl. .............. 425/132; 425/287; 425/133.1
[51] Int. Cl.² .................. A21C 11/18; A21C 9/06
[58] Field of Search ......... 426/549, 439; 425/131.1, 425/132, 133.1; 99/450.7, 354

[56] References Cited
UNITED STATES PATENTS

| | | | |
|---|---|---|---|
| 573,432 | 12/1896 | Megson | 425/133.1 |
| 2,313,060 | 3/1943 | Friedman | 425/132 |
| 2,803,041 | 8/1957 | Hill et al. | 425/132 |
| 3,452,687 | 7/1969 | Kaneko et al. | 425/132 |
| 3,605,641 | 9/1971 | Shuster | 99/450.7 |
| 3,653,336 | 4/1972 | Kaneko et al. | 425/132 |

*Primary Examiner*—Francis S. Husar
*Assistant Examiner*—David S. Safran
*Attorney, Agent, or Firm*—Seed, Berry, Vernon & Baynham

[57] ABSTRACT

A method and apparatus for making filled products of various shapes and sizes and the products. The products can be toroidal, rings of interconnected knobs, crescent-shaped, spherical or other shapes, each having one or more discrete spots or globs of filling material within. The filling material can be injected in any direction without the product, for example, sidewise along the midline of a toroidal product, or radial in the toroidal product. The amount of filling material and its location within the product can be varied. The filling material flow is controlled by positive and negative pressure.

22 Claims, 32 Drawing Figures

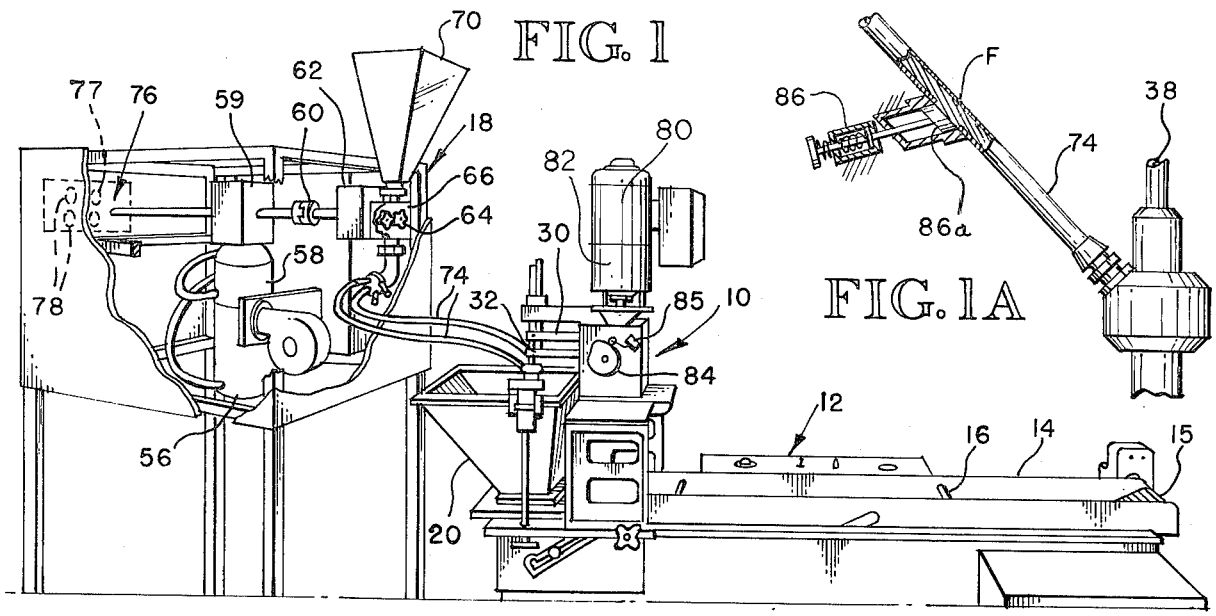
FIG. 1
FIG. 1A
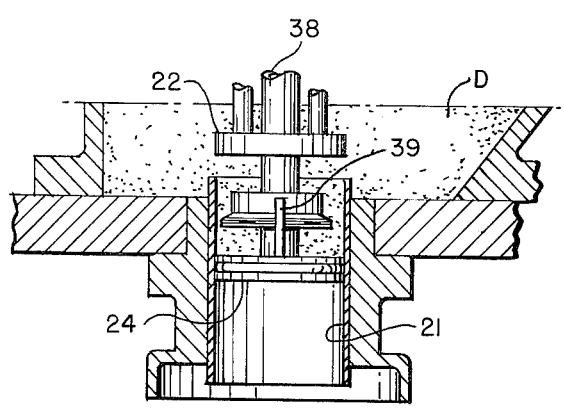
FIG. 2
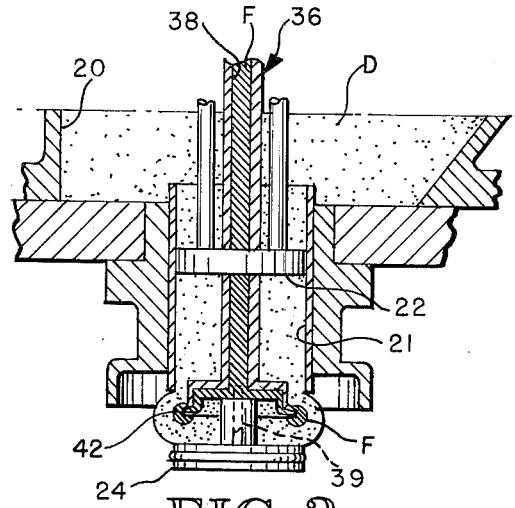
FIG. 3
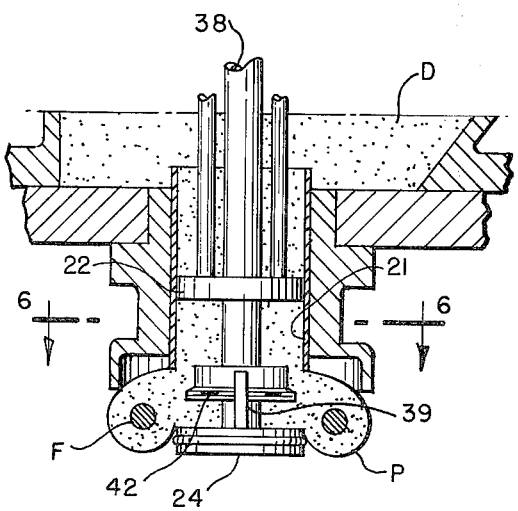
FIG. 4
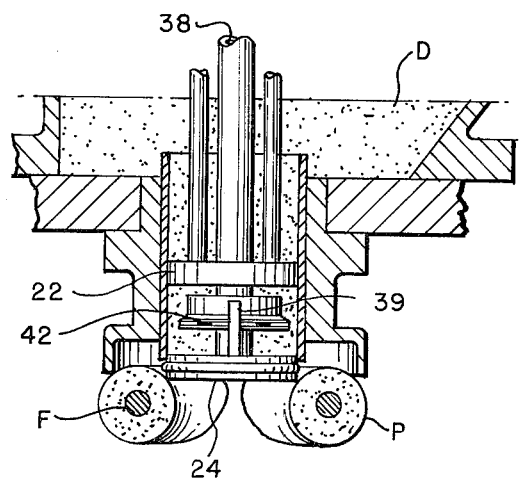
FIG. 5

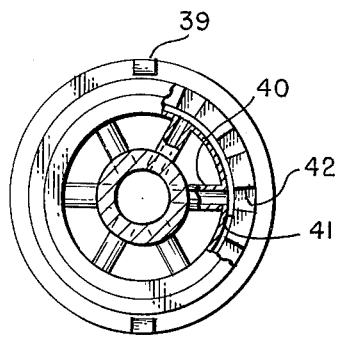
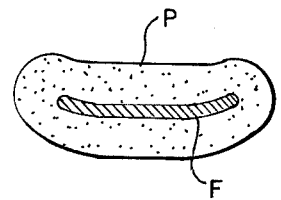
FIG. 6        FIG. 7
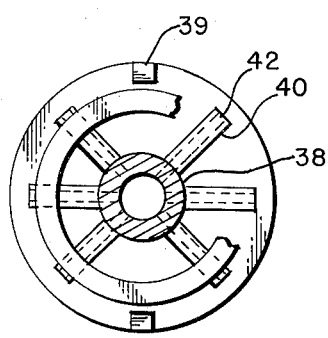
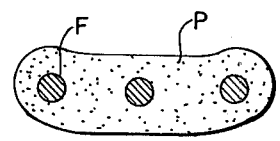
FIG. 6A        FIG. 7A
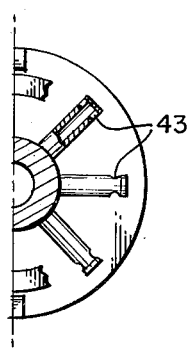
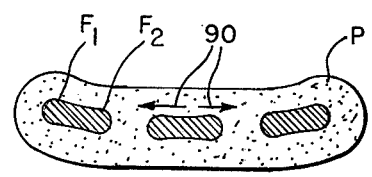
FIG. 6B        FIG. 7B
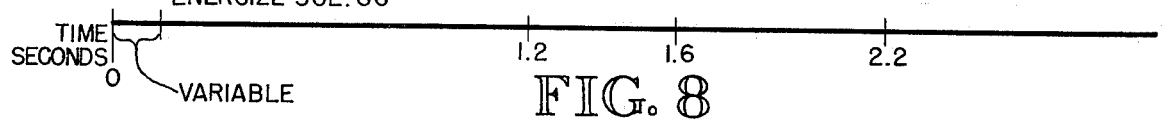
FIG. 8

APPARATUS FOR MAKING FILLED FOOD PRODUCTS

CROSS-REFERENCE TO RELATED APPLICATION

This application is a continuation-in-part of our earlier application, Ser. No. 463,155, filed Apr. 22, 1974.

BACKGROUND OF THE INVENTION

1. Field of the Invention

This invention pertains to improvements in methods and apparatus for the production of filled, edible products, particularly, but not limited to, irregularly shaped products and to the products so formed.

2. Description of the Prior Art

Various types of techniques have been used for injecting into edible products, such as doughnuts or other confection products, a filling material, such as cream or jelly. These devices primarily use some form of extrusion technique for forming the product, then either extrude or inject the filling material into the product while in a yet unformed state, and then finally form the product around the filling material. These various techniques have generally involved very elaborate mechanical mechanisms to control and guide the flow of both the filling material and the product material, and thus have been expensive to manufacture and difficult to maintain.

One problem in injecting the filling material into edible products that are later cooked, as in a fryer, is that the filling material, during the injecting process, is not adequately sealed from the outside surface of the product, preventing the formation of a good bond between the product material at the surface of the product and impairing the quality and appearance of the final product.

Various of the most pertinent techniques known to Applicants for filling doughnut-like products are described in the following U.S. Pat. Nos. 3,452,687; 3,362,355; 3,653,336; 3,196,810; 2,982,231; 1,933,557; 516,648 and 3,807,919.

Our earlier application, Ser. No. 463,155, discloses and claims interalia the concept of controlling the injection of filling material into the product material by applying positive pressure on the filling material to discharge it and applying negative pressure on the filling material to withdraw a portion of it for stopping the discharge. This broad concept was described as being suitable for products of any shape and any type of filling material. This application is an improvement on such earlier application in that it discloses and claims specific products and specific methods and apparatus for making products of various shapes, primarily each with discrete spots of filling material within.

Heretofore, filled edible products were limited in shape and size due to the necessity of injecting the filling material into the product in a manner such that it would not leak out or cause failure of the structure of the product. One attempt at solving this problem for a specific toroidal or doughnut-shaped product is described in U.S. Pat. No. 3,807,919. This patent discloses a filling material injecting nozzle which has a mechanical valve that opens and closes to control the discharge of filling material into the product. Such a mechanical valve frequently leaves a dribble of filling material still flowing when the edible product material is injected around. This dribble creates defects in the product, such as a weak plane in a toroidal shape, because the dribble prevents an adequate bond of the product material around the filling material. Furthermore, the mechanical valving mechanism of U.S. Pat. No. 3,807,919 limits the types, shapes and sizes of products that can be made.

SUMMARY OF THE INVENTION

It is an object of this invention to provide an improved method for forming edible products with discrete spots of filling material within.

It is another object of this invention to provide an improved method and apparatus for forming irregularly shaped products of various types with one or more spots of filling material within.

It is another object of this invention to provide a method and apparatus for providing an improved toroidal-type doughnut having circumferentially spaced spots of filling material within which result in a structurally stronger filled doughnut than heretofore possible.

It is another object of this invention to provide a variety of novel, filled, edible product configurations.

It is another object of this invention to provide a method and apparatus for providing a structurally improved, better appearing, filled, edible product.

Basically, these objects are obtained in one aspect of the invention by providing a method and apparatus for injecting spots of filling material into products of various shapes.

Another aspect of this invention is to provide a method and apparatus for controlling the injection of filling material by positive and negative pressure in discrete filling material paths or tubes for providing discrete spots of filling material within an edible product.

Still another aspect of this invention is to provide edible products of various shapes, each of which has a completely closed, well-bonded, edible product surface completely surrounding a spot or glob of filling material.

Various types of edible products are made according to this invention. The preferred product is a doughnut-type, edible product with a cream or jelly filling. Other products are potato balls filled with cheese, shaped dog food products, such as meatballs filled with a filling, or various other products. Obviously, the products do not even have to be edible as the invention can be used for other applications having an outer material completely enclosing an inner filling material.

Various shapes may include spherical balls having a center of filling material, crescent-shaped products having single or multiple spaced spots of filling material, crescent shaped having a continuous line of filling material, conventional toroidal dougnut shapes having circumferentially spaced spots of filling material, interconnected rings of knob-like products, each having a spot of filling material within, etc. In each case, the edible product surrounding the filling material will be structurally completely bonded, resulting in a strong product which will resist breaking when being coated or which, even without a coating, will have a smooth, aesthetic appearance.

The use of spots or separated spots of filling advantageously allows products of smaller sizes because a smaller amount of structure is required to direct the path of the filling material into the product material. The separated spots give better structural connection since there is considerably more locations where product material extends transversely all the way across the cross-section of the product. When the customer initially breaks open the product, where separated spots are used in an elongaged product, such as around a doughnut or along a crescent-shaped product, the product will almost always break at a filling material spot so that the appearance to the customer is of a continuously filled doughnut. Thus the customer is able to have a filled product which will resist breaking before being eaten.

The use of positive and negtive pressure for controlling the injection of the filling material also advantageously allows the use of filling materials of different viscosities, thus allowing the manufacturer to use a wider variety of and less expensive filling material.

In one embodiment of the invention, the discharge of the filling material into the product can be along the length of the product or generally parallel to the outer walls of the product so that it is less likely to be extruded through or break through the wall of the product when being injected. The invention will be described in terms of "spots" of filling material but it should be understood that any quantity of filling material can be injected into the spot, either as a small dot or as a large glob, and that particularly with sidewise discharge of the filling material into the product, the globs can be interconnected, if desired, to form almost a continuous chain of globs of filling material.

BRIEF DESCRIPTION OF THE FIGURES OF THE DRAWINGS

FIG. 1 is an isometric illustration of a center-filled-product making apparatus embodying the principles of the invention.

FIG. 1A is a fragmentary illustration of a modified form of the apparatus shown in FIG. 1.

FIGS. 2–5 are vertical sections taken through the product-extruding portion of the apparatus shown in FIG. 1 at various sequences to illustrate the formation of a pair of filled, crescent-shaped products.

FIG. 6 is a diametrical section taken along the ling 6—6 of FIG. 4.

FIG. 7 is a lengthwise section of a crescent-shaped product made with the embodiment illustrated in FIG. 6.

FIG. 6A is a modified form of apparatus, also taken along the line 6—6 of FIG. 4, but for making discrete spots of filling material in the product.

FIG. 7A is a lengthwise cross-section of a product made with the apparatus of FIG. 6A.

FIG. 6B is a modified form of apparatus, also taken along line 6—6 of FIG. 4, but for making sidewise discharged spots of filling material in the product.

FIG. 7B is a length wise cross-section of a product made with the apparatus of FIG. 6B.

FIG. 8 is a timing diagram illustrating an operational sequence of the apparatus.

DETAILED DESCRIPTION OF THE PREFERRED EMBODIMENTS

Figure 9:
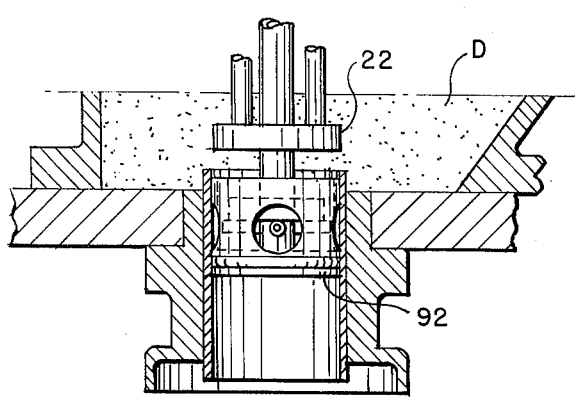
FIGS. 9–12 are vertical sections of the extruding portion of the apparatus of FIG. 1 illustrating various sequences of steps for forming spherical balls with a center filling.

As best shown in FIG. 1, the filled-product making apparatus includes a unique cutter head 10 embodying the principles of the invention which is carried on a well-known doughnut fryer 12. The fryer employs a tank 14 which holds hot cooking oil through which the doughnuts or other products are carried by a conveyor 15. A paddle 16 overturns the doughnuts as they travel through the tank in a well-known manner. Further details of the frying unit are not believed necessary to an understanding of the invention.

Sitting adjacent the frying unit is a filling material dispenser 18 which, as will be described herein below, operates in conjunction with the cutter head 10 to inject semisolid filling material, such as jelly, into a wide variety of products.

As is best shown in FIGS. 1 and 3, the cutter head includes a conventional hopper 20 for holding a supply of edible product D. Seated in the bottom of the hopper is a forming cylinder 21 through which the product material D is extruded. The product material is pushed through the cylinder by a metering pistion 22. A forming piston 24 is positioned axially a variable-spaced distance below the metering piston to provide a forming surface for the bottom of the doughnut or other product and to also act as a cutter to sever the product from the forming cylinder, allowing it to fall into the tank 14. As thus far described, the cutter head is similar to known doughnut formers, such as illustrated in U.S. Pat. No. 2,643,621. The pistons 22 and 24 are reciprocated in timed sequence relative to one another by cams in a well-known manner and as illustrated in more detail in said copending application, Ser. No. 463,155. The cams are driven through a combination motor-brake and oscillate cam levers 30 and 32 to reciprocate the metering piston 22 and forming piston 24, respectively.

Jelly or other filling material is injected into the product P during the extruding process to form a line (FIG. 7) or, preferably, a discrete spot or spots (FIGS. 7A and 7B) of filling material. For this purpose, the forming piston 24 is secured to an actuating rod 36, the intermediate portion of which is a hollow tube 38. The bottom of the tube 38 is solid, as at 39, to form a plug for the end of the hollow tube. As best shown in FIG. 6A, the hollow tube 38 terminates in a plurality of radially directed tubes 40, each having an axial discharge opening 42, as best shown in FIG. 6A or a ring as in FIG. 6. In the embodiment shown in FIG. 6B, the discharge openings can be side openings 43 to get a sidewise discharge of the filling material and can be on either one side of each tube 40 or both sides, as illustrated. As is readily apparent, the filling material is moved through the tube 38 and out the discharge passages 42 or 43 to provide discrete spots of filling material adjacent each tube 40.

The dough D is free to pass between the radial tubes 40 and thus around the discharge openings of the tubes as well as outwardly between the lower end of the cylinger 21 and the forming piston 24. In this manner, the product material is extruded against the forming piston and moves radially outwardly above and below the discharge openings of the tubes.

Movement of the filling material through the discharge openings or ports 42 and 43 is uniquely controlled by sequential application of positive and negative pressure to the tube 38 in the manner described in detail in said copending application. For the purpose of this description, the filling material dispenser is provided with a conventional three-phase motor 56 and a brake 58 to drive a gear reducer 59. The gear reducer is provided with an output shaft 60 that drives a twin-output gear box 62. The outputs of the gear box are coupled to a pair of impellers 64 of a metering pump 66. The pump is of a conventional type, providing a positive displacement of filling material from a hopper 70 to the filling material discharge openings in exactly measured amounts. The quantity of filling material is determined from a control panel 76 having a meter readout dial 77 coupled to the shaft 60 and a plurality of variable electric controls 78 for energizing the motor 56 and brake 58 and synchronizing the energization with movement of the product-forming elements of the cutter head 10. The control panel is provided with various time delay relays, which, through related circuitry, run the pump 64 to force filling material through a pair of lines 74 to the tube 38, thence through the discharge ports 42. It is not critical that particular controls be employed. After a predetermined amount of filling material is discharged from the ports, the control automatically applies a delay period and then reverses the pump 66 to place a negative pressure on the filling material in the lines 74 to withdraw a portion of the filling material from the discharge ports back into the tubes 40. In this manner, the flow of filling material in the formed product is completely terminated. As described in said copending application, the filling material is pulled back through the discharge ports so that no trails or dribbles of filling material are left between the spot of filling material and the outer surface of the product. The controls are variable so that either the quantity of filling material injected can be varied or the length of time of negative pressure varied, depending upon the type of product being formed and the viscosity and like characteristics of the filling material. Furthermore, a suitable, adjustable time delay is provided to initiate the injection of the filling material into the product so that the location of the filling material radially in the product can be varied, if desired.

As described earlier, the control of the filling material by positive and negative pressure enables various types of products to be formed, whether using discrete spots of filling material or a ring of filling material as in the copending application. One such product is illustrated in FIG. 7 and is made on the apparatus illustrated in FIGS. 2–6. This embodiment utilizes a discontinuous ring of discharge ports 42 connected to the tubes 40 by metering cavity 41, as described in said copending application. Thus a generally discontinuous ring of filling material is extruded. The embodiment is much the same as that shown in said copending application, with the exception of the diametrically opposed partition bars 80 which protrude vertically upwardly from the forming piston 24. As best shown in FIG. 2, product D gets trapped between the metering and forming pistons and, as the forming piston leaves the bottom of the cylinder 21, the product begins to get extruded radially in a continuous ring from between the lower end of the cylinder 21 and the forming piston 24. The filling material also passes between the tubes 40 so that is passes over the top and from below the discharge ports 42. At the desired time, the filling material F is pushed out through the openings 42. After a time delay, the filling material is subjected to negative pressure, which withdraws a portion into the openings 42, and the metering piston is moved further downward to push the product material between the discharge opening 42 and the injected filling material, as shown in FIG. 4. Finally, the forming piston is raised to pinch off the product material, with the product falling into two separated pieces due to the blocking of material at diametrically spaced points on the product by the partition bars 80. FIG. 7 illustrates a cross-section of the product which is somewhat crescent-shaped and has an essentially continous string of filling material positioned in the center of the product.

FIG. 6A is also provided with the partition bars 80, but with the separated tubes and separated discharge openings 42, such that discrete separated dots of filling material F are provided in the product P. The product in outside appearance is identical to that shown in FIG. 7.

FIG. 6B illustrates an embodiment in which the discharge of filling material is through side ports 43 so that two dots of filling material (F1 and F2) are provided. The spots then come together to form the oval-shaped spots as shown in FIG. 7B. The outside of the product 7B is, of course, the sum as that in FIGS. 7 and 7A. An advantage of the side discharge of the filling material is that its path is essentially parallel to the outer surfaces of the product, as best shown by the arrows 90 in FIG. 7B, so that substantially greater amounts of filling material can be injected without the risk of the filling material pushing through the outer surface or wall of the product. Control of the radial location of the filling material within the product, however, can also be provided with the axial discharge ports 42 of FIG. 6A by properly timing through trail and error to correlate movement of the product material with movement of the filling material.

Figure 10:
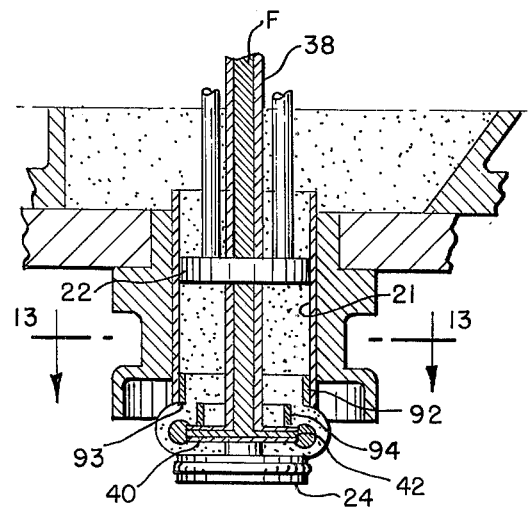
Figure 11:
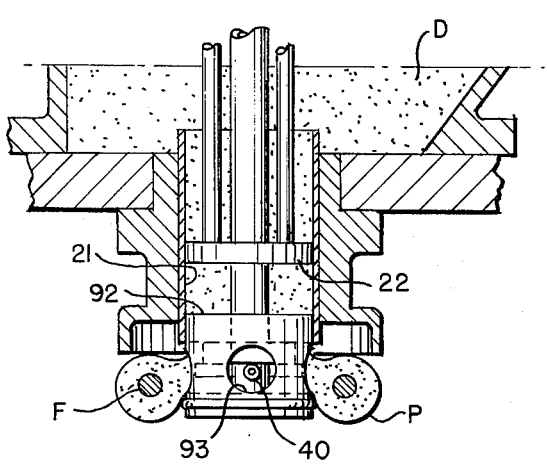
Figure 12:
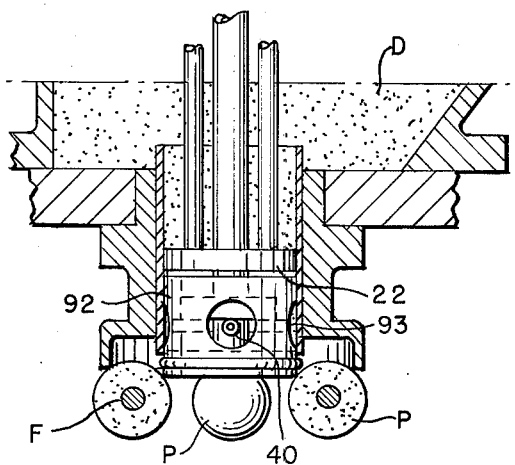
Figure 13:
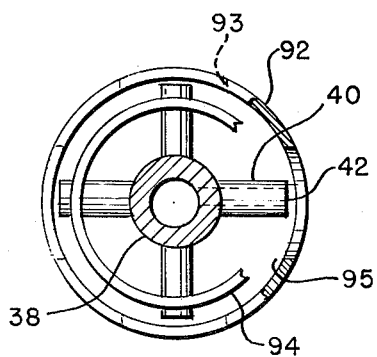
FIG. 13 is a diametrical section taken along the line 13—13 of FIG. 10.
Figure 14:
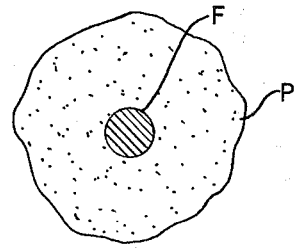
FIG. 14 is a diametrical cross-section of a spherical filled ball made with the apparatus of FIGS. 9–12.
Figure 15:
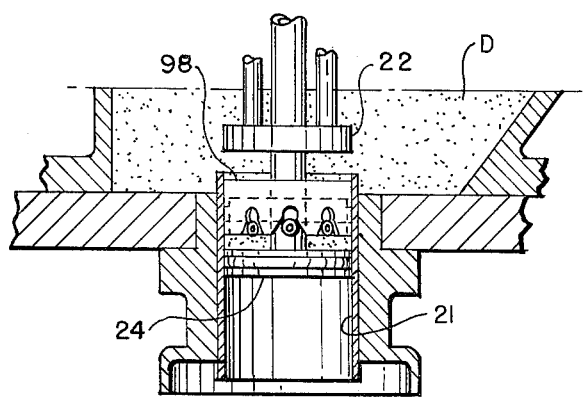
FIGS. 15–18 are vertical sections of the extruding apparatus of FIG. 1 illustrating various sequences of operations for forming an interconnected ring of knob-like products, each with a spot of filling within a knob.

FIGS. 9–13 illustrate an apparatus for making a spherical-type product with a center filling, as shown in FIG. 14. In this embodiment, a circular partition 92 is secured to the forming piston 24 and is provided with four equidistantly, circumferentially spaced orifices or openings 93. An inner partition 94, concentric with the partition 92, guides the product material into a ring-like cavity 95 so that discrete balls of product can be extruded through the openings 93. Extrusion of the product occurs as in the earlier-described embodiments, with product material passing down through passage 95 and out the openings 93. In FIG. 10, the filling material is injected. In FIG. 11, the filling material has been stopped, and further extrusion pushes the product in four circumferentially spaced paths paths radially from the forming cylinder 21. In FIG. 12, the forming piston 24 has moved up, pinching the product into spheres, each with a center filling as shown in FIG. 14.

Figure 16:
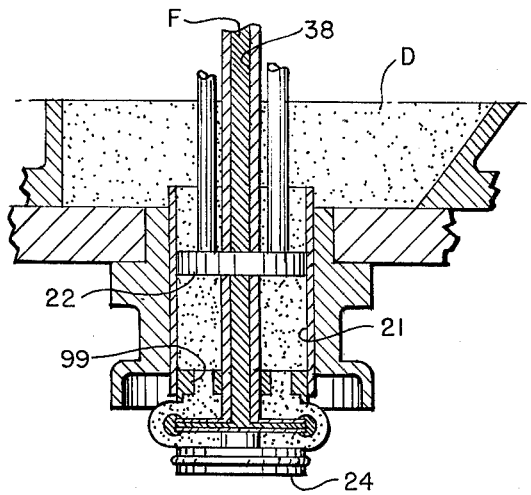
Figure 17:
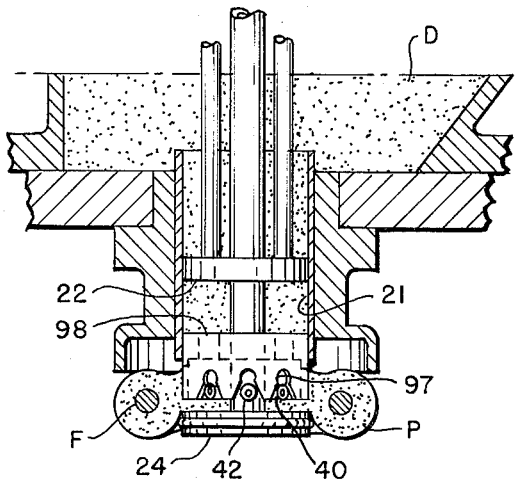
Figure 18:
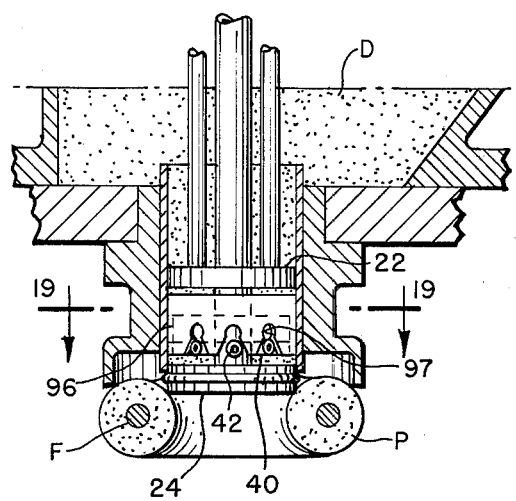
Figure 19:
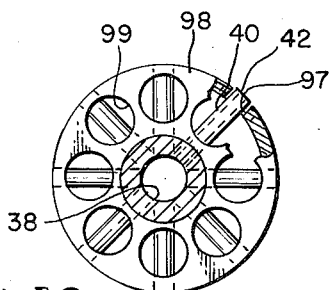
FIG. 19 is a diametrical section taken along the line 19–19 of FIG. 18.
Figure 19A:
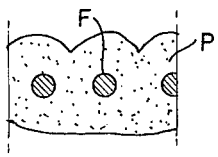
Figure 20:
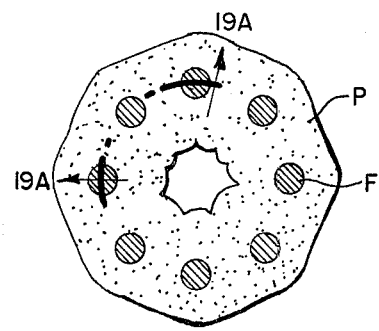
FIG. 20 is a diametrical cross-section of a ring of knobs made with the apparatus of FIGS. 15–18.
Figure 21:
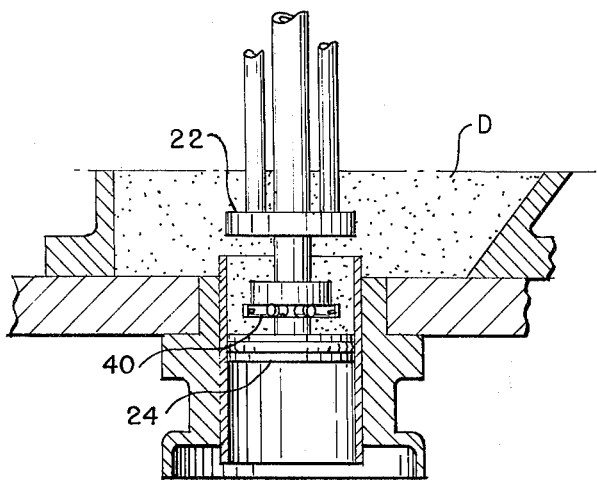
FIGS. 21–24 are vertical sections of the extruding portion of the apparatus of FIG. 1 illustrating a sequence of operations for making a toroidal or conventional doughnut-shaped product having circumferentially spaced dots of filling material therein.
Figure 22:
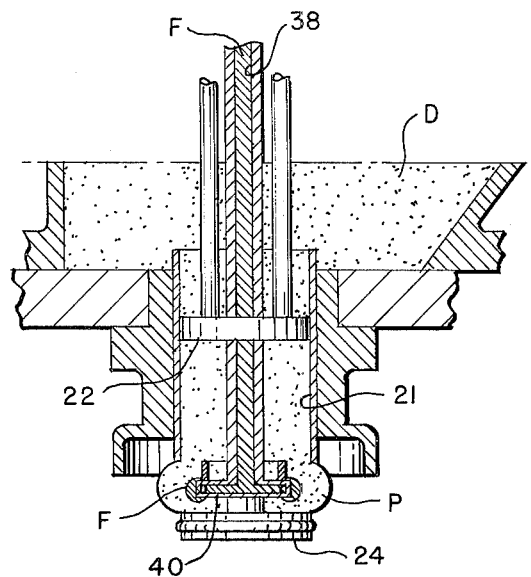

FIGS. 15–18 illustrate an apparatus for forming a ring of interconnected knobs, as illustrated in FIG. 20. In this embodiment, a circular partition 96 is provided with circumferentially spaced recesses 97 in which is centered the discharge opening 42 of each tube 40. The partition 96 is capped by a planar partition 98 provided with openings 99 aligned with the recesses 97. In FIG. 16, product material is extruded downwardly through the openings 99, out the recesses 97 and around the discharge openings 42 of the tubes 40. In FIG. 17, the filling material has been injected and stopped, and the product further extruded. In FIG. 18, the forming piston 24 has been raised to pinch off the product P in the shape of a ring of interconnected knobs. FIG. 20 illustrates a horizontal view through the product, whereas FIG. 19A is a fragmentary vertical section taken in the direction of line 19A—19A of FIG. 20.

Figure 23:
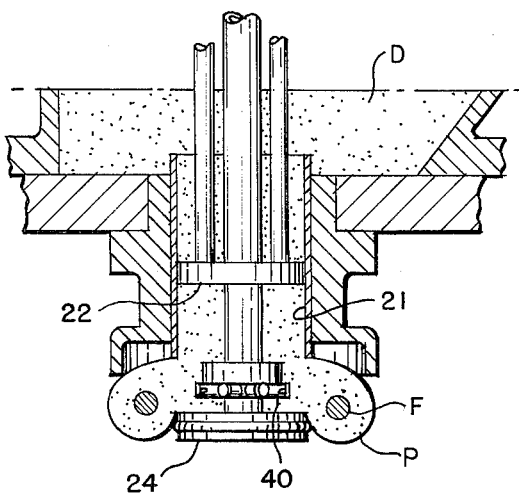
Figure 24:
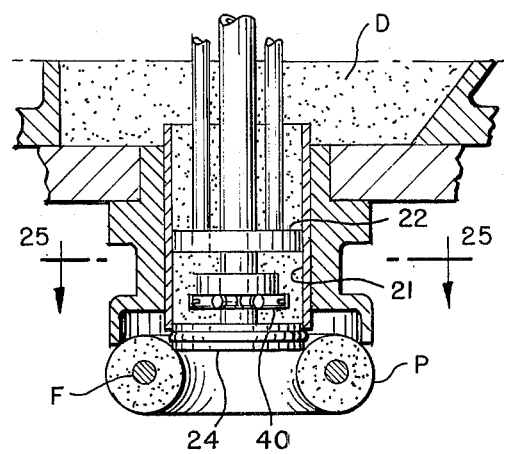
Figure 25:
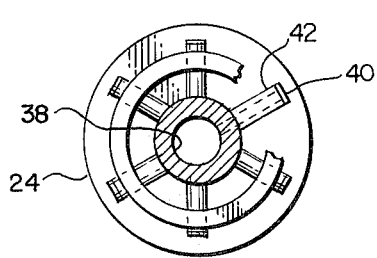
FIG. 25 is a diametrical section taken along the line 25—25 of FIG. 24.
Figure 26:
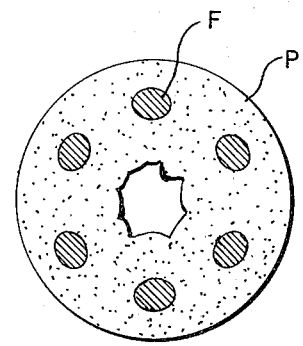
FIG. 26 is a diametrical cross-section of a toroidal-shaped product made with the apparatus of FIGS. 21–24.

FIGS. 21–24 illustrate an apparatus for making a conventional toroidal or doughnut-type shape with circumferentially spaced, discrete spots of filling material, as shown in FIG. 26. In this embodiment, there are no restrictions or partitions between the cylinder 21 and the forming piston 24; and insofar as the product extrusion is concerned, it is identical to the embodiment illustrated in said copending application. Filling material is provided through tubes 40 and discharge openings 42. Product material is extruded downwardly, as in FIG. 22, around the discharge openings 42. A predetermined amount of filling material is injected, as in FIG. 22. In FIG. 23, the filling material has been stopped, and further extrusion of the product material places additional product material between the spots of filling material F and the discharge openings 42. In FIG. 24, the forming piston has been retracted to pinch off a toroidal-shaped doughnut with separate, circumferentially spaced, discrete spots of filling material F, as shwon in FIG. 26.

The modification of FIG. 1A is employed for multiple product making apparatuses where the lines between the pump 66 and the tubes 38 of the apparatuses become quite long. As the lines between the tubes 38 and the pump 66 get longer, the reversal of the pump has an immediate decreasing effect on the filling material at the discharge openings 42 and 43. In FIG. 1A, a piston 86a of larger diameter than the diameter of line 74 is normally spring-biased outwardly of the line 74 and solenoid-powered into the closed position shown in FIG. 1A. As the filling material is moved from the pump to the discharge openings, solenoid 86 is energized to extend the piston 86a. When pump 66 is reversed, the solenoid 86 is de-energized, causing the spring to retract the piston 86a, immediately drawing a portion of the filling material up through tube 38. Thus the piston brings more instantaneous withdrawing control on the filling material, for cleaner, more positive cutoff.

A typical operational sequence is illustrated in FIG. 8. A switch 85 (FIG. 1) senses the location of the stroke of the forming and metering pistons and signals to stop motor 80 and apply brake 82 to stop the forming and metering pistons. After a desired variable time delay, pump 66 is energized forward and solenoid 86 energized (for long line apparatus). After the filling material is injected, the pump is stopped and a hold period initiated to allow the filling material to move into the void in the product material. Next, the pump is reversed and solenoid 86 de-energized to withdraw filling material. Finally, the pump is stopped and the metering and forming pistons again put into operation.

The timing illustrated should be understood to be variable and modified by trial and error for a few products to obtain the best formed product using a particular formulation of filling and product materials.

While various forms of the invention have been illustrated and described, it should be understood that additional variations will be apparent to one skilled in the art without departing from the principles expressed herein. Accordingly, the invention is not to be limited to the specific embodiments illustrated.

The embodiments of the invention in which a particular property or privilege is claimed are defined as follows:

1. Apparatus for filling edible products with spots of filling material, comprising:
   means for partially forming the product into its final form,
   discrete separated tubes having discharge openings for injecting filling material into said partially formed product,
   means for pushing a predetermined amount of filling material through said tubes and out said discharge openings to inject discrete spots of filling material within said partially formed product,
   means for halting the flow of filling material, and
   means for finally forming the product between the tube discharge openings and the injected filling material to form a final product completely enclosing at least one spot of filling material, said means for partially forming the product including a product material hopper having a forming cylinder, forming piston means reciprocably mounted in said forming cylinder, metering piston means axially spaced from said forming piston means and independently reciprocably mounted in said forming cylinder, means for reciprocating the forming and metering piston means in said forming cylinder to trap a quantity of product material and extrude it radially outwardly of said forming cylinder, said tubes extending lengthwise radially of said metering piston means for discharging discrete spots in the radially extruded product material.

2. The apparatus of claim 1, including at least two diametrically opposed, vertical partition bars on said forming piston for dividing the opening of the forming cylinder into at least two sections to form circumferentially discontinuous products, each containing at least one spot of filling material.

3. The apparatus of claim 1, including an outer circular partition wall on said forming piston and having a plurality of circumferentially spaced, product-forming openings, each tube centered in a forming opening, an inner circular partition wall on said forming piston concentric with said outer circular partition wall of forming discrete balls of edible product, each containing a spot of filling material.

4. The apparatus of claim 1, including an outer circular partition having a plurality of downwardly opening, circumferentially spaced recesses with a tube central in each recess, said outer circular partition having an upper circular planar cap lying diametrically across said recesses for forming a product of a continuous ring of knobs of edible product, each having a spot of filling material within.

5. The apparatus of claim 1, the space between the forming piston and the metering piston adjacent said tube discharge being unrestricted whereby a continuous torodial product is formed having circumferentially spaced spots of filling material therein.

6. Apparatus for filling edible products with discrete spots of filling material, comprising:
- means for partially forming the product into its final form,
- a plurality of discrete, separated tubes, each having a discharge opening for injecting filling material into said partially formed product,
- means for applying positive pressure on said filling material in said tubes and for applying negative pressure on said filling material to partially retract the flow of filling material, and
- means for finally forming the product between said discharge openings and the injected filling material to form a final product completely enclosing the spots of filling material, said means for partially forming the product including a product material hopper having a forming cylinder, forming piston means reciprocably mounted in said forming cylinder, metering piston means axially spaced from said forming piston means and independently reciprocably mounted in said forming cylinder, means for reciprocating the forming and metering piston means in said forming cylinder to trap a quantity of product material and extrude it radially outwardly of said forming cylinder, said tubes extending lengthwise radially of said forming cylinder between said forming piston means and said metering piston means for discharging discrete spots of filling material in the radially extruding product material.

7. The apparatus of claim 6, including at least two diametrically opposed, vertical partition bars on said forming piston for dividing the opening of the forming cylinder into at least two sections to form circumferentially discontinuous products, each containing at least one spot of filling material.

8. The apparatus of claim 6, including an outer circular partition wall on said forming piston and having a plurality of circumferentially spaced, product-forming openings, each tube centered in a forming opening, an inner circular partition wall on said forming piston concentric with said outer circular partition wall for forming discrete balls of edible product, each containing a spot of filling material.

9. The apparatus of claim 6, including an outer circular partition having a plurality of downwardly opening, circumferentially spaced recesses with a tube central in each recess, said outer circular partition having an upper circular planar cap lying diametrically across said recesses for forming a product of a continuous ring of knobs of edible product, each having a spot of filling material within.

10. The apparatus of claim 6, the space between the forming piston and the metering piston adjacent said tube discharge being unrestricted whereby a continuous toroidal product is formed having circumferentially spaced spots of filling material therein.

11. Apparatus for filling edible products with spots of filling material, comprising:
- means for partially forming the product into its final form,
- filling nozzle means having circumferentially spaced discharge openings for injecting discrete spots of filling material into said partially formed product,
- means for pushing a predetermined amount of filling material through said filling nozzle and out said discharge openings to inject discrete spots of filling material within said partially formed product,
- means for halting the flow of filling material,
- means for finally forming the product between the filling nozzle discharge openings and the injected filling material to form a final product completely enclosing at least one spot of filling material,
- said means for partially forming the product including a product material supply having a forming cylinder with a discharge end,
- disk means having a peripheral edge generally coaxially aligned with said forming cylinder discharge end for providing a generally radially opening product material discharge passage,
- means selectively opening and closing said product material discharge passage for passing a quantity of product material through said forming cylinder and generally radially out said product material discharge passage to form a final product having radially inner and outer portions,
- said filling nozzle discharge openings opening into said product material discharge passage for forming a final product having partially radially spaced but interconnected portions of product material with a discrete spot of filling material between the radially spaced portions.

12. The apparatus of claim 11, said filling nozzle including a plurality of discrete, separated, circumferentially spaced radially extending tubes each terminating in a discharge opening within said product material discharge passage.

13. The apparatus of claim 12, said discharge openings in said tubes lying perpendicular to the length of the tube whereby the discharge of filling material is in a direction sidewise of the product and generally parallel to the outer surface of the product.

14. The apparatus of claim 12, said discharge openings in said tubes each lying coaxially at the end of each tube whereby discharge of filling material is in the same direction as the movement of product material.

15. The apparatus of claim 11, including control means for delaying discharge of the filling material for varying the location of the filling material within the product.

16. The apparatus of claim 11, said means for partially and finally forming the product including dividing means for separating the product into circumferentially spaced units each having at least one spot of filling therein.

17. Apparatus for filling edible products with discrete spots of a relatively low-viscosity, readily flowable filling material, comprising:
- means for partially forming the product into its final form,
- filling nozzle means having a plurality of discrete, separated discharge openings for injecting discrete spots of filling material into said partially formed product,
- means applying positive pressure on said filling material in said filling nozzle and applying negative pressure sufficient to completely eliminate any positive pressure acting on said filling material for halting the flow of filling material out said discharge openings, and means for finally forming the product between said discharge openings and the injected filling material to form a final product completely enclosing the spots of filling material, said means for partially forming the product including a product material supply and cylindrical forming means, disk means having a peripheral edge generally coaxially aligned with said cylindrical forming means for providing a generally radially opening product material discharge passage, means selectively opening and closing said product material discharge passage for passing a quantity of product material through said cylindrical forming means and generally radially out said product material discharge passage to form a final product having radially inner and outer portions, said filling nozzle means discharge openings opening into said product material discharge passage for forming a final product having partially radially spaced but interconnected portions of product material with a discrete spot of filling material between each radially spaced portion.

18. The apparatus of claim 17, wherein said product material is formed in an atmosphere of a first pressure, said means applying a negative pressure on said filling material including means applying on said filling material a negative pressure less than said first pressure for withdrawing a portion of the filling material into said filling nozzle means and pulling a portion of said product material against said discharge openings for sealing the discharge openings against filling material leakage.

19. The apparatus of claim 17, said filling nozzle including a plurality of discrete, separated, circumferentially spaced tubes each terminating in a discharge opening within said product material discharge passage.

20. The apparatus of claim 18, said means for partially and finally forming the product including dividing means for separating the product into circumferentially spaced units each having at least one spot of filling therein.

21. The apparatus of claim 18, including control means for varying the time of energization of the means for applying positive and negative pressure on said filling material relative to the location of the extruded product material and the length of energization to vary the location and quantity of the filling material within the product.

22. The apparatus of claim 18, said means for applying negative pressure including primary pump means for applying the negative pressure and means supplemental to said primary negative pressure pump means and located close to the filling material discharge openings for providing rapid responsive retraction of the flow of filling material at the discharge openings.

* * * * *